(12) United States Patent
Hartmann et al.

(10) Patent No.: US 6,919,802 B2
(45) Date of Patent: Jul. 19, 2005

(54) MULTI-LAYER METHOD OF ACCOMMODATING CODE COLLISIONS FROM MULTIPLE SURFACE ACOUSTIC WAVE IDENTIFICATION TAGS

(75) Inventors: Clinton S. Hartmann, Dallas, TX (US); John C. Bellamy, Coppell, TX (US)

(73) Assignee: RF Saw Components, Inc., Richardson, TX (US)

( * ) Notice: Subject to any disclaimer, the term of this patent is extended or adjusted under 35 U.S.C. 154(b) by 205 days.

(21) Appl. No.: 10/615,257

(22) Filed: Jul. 8, 2003

(65) Prior Publication Data

US 2005/0007238 A1 Jan. 13, 2005

(51) Int. Cl.[7] .......................... G08B 29/00; H04Q 5/22
(52) U.S. Cl. ................ 340/512; 340/572.1; 340/572.4; 340/10.2; 340/10.4; 235/385; 705/22; 705/28
(58) Field of Search ................ 340/512, 505, 340/572.1, 572.4, 10.1, 10.2, 10.4, 10.41, 10.42, 10.3; 235/385, 384; 705/22, 28; 342/42

(56) References Cited

U.S. PATENT DOCUMENTS

| | | | | |
|---|---|---|---|---|
| 5,784,403 A | * | 7/1998 | Scott | 375/151 |
| 6,407,695 B1 | * | 6/2002 | Stierlin et al. | 342/42 |
| 6,433,671 B1 | * | 8/2002 | Nysen | 340/10.41 |
| 6,456,239 B1 | * | 9/2002 | Werb et al. | 342/463 |
| 6,633,226 B1 | * | 10/2003 | Nysen | 340/10.1 |

* cited by examiner

*Primary Examiner*—Donnie L. Crosland

(57) ABSTRACT

A method of accommodating code collisions from multiple SAW identification tag coded response pulses. In one embodiment, the method includes: (1) separating probable candidates by time-domain; (2) classifying the probable candidates by code-division separation; (3) employing known coded identification signals to adjust the probable candidates; and (4) correlating the multiple SAW identification tag coded response pulses to identify the probable candidates for further processing.

20 Claims, 4 Drawing Sheets

MULTI-LAYER METHOD OF ACCOMMODATING CODE COLLISIONS FROM MULTIPLE SURFACE ACOUSTIC WAVE IDENTIFICATION TAGS

TECHNICAL FIELD OF THE INVENTION

The present invention is directed, in general, to identification tags and, more specifically, to a method for accommodating code collisions from multiple surface acoustic wave (SAW) identification tag responses.

BACKGROUND OF THE INVENTION

A number of different electronic identification systems and devices are presently in use, ranging from ubiquitous bar code and magnetic strip systems to silicon chip radio frequency identification ("RFID") tag systems. Because bar codes and magnetic strips have a very short effective read range and are usually read one at a time, seldom will the reading of one bar code or magnetic strip interfere with the reading of another. Although silicon chip based RFID tag systems have a longer read range than magnetic strip or bar code systems, the tags are relatively expensive and are not widely used (except for limited applications such as toll tags and security systems), which means most such prior art RFID tags will also generally be individually read with little opportunity for one such tag to interfere with another.

Up to the present time, the current state of the art has not addressed the significant signal collision problem caused by simultaneous identification tag responses. As RFID tags become less expensive, RFID tag suppliers are working hard on solving the collision problem. Because of the nature of a semiconductor tag the approach is quite different than the approach taken for SAW tags. The semiconductor approach involves a protocol that limits the number of smart tags in a field of view that respond to an interrogation. The term "smart" refers to the fact that an individual semiconductor tag, or group of tags with a common address code, can be commanded to respond or not respond.

The situation is different, however, with respect to identification tags that are based on surface acoustic wave (SAW) technology. Because all SAW tags in a field of view always respond a different approach is needed. With the introduction of inexpensive identification SAW tags the problem has ripened to a point where a solution to signal collisions is required.

The problem is quite apparent when a number of SAW tags are simultaneously interrogated, which will occur frequently because SAW technology permits tags to be read at a relatively long range. With each SAW tag responding to the interrogation signal, it is a certainty that interference problems will occur. The problem can be further illustrated by considering the transmission of an interrogation pulse to a large number of articles, each with its own uniquely coded SAW identification tag, that are stacked on a pallet. Because each SAW identification tag on each article will respond by transmitting its own globally unique coded response signal, it may be difficult to process the mass of signal data to accurately detect and decode each response and reliably identify each article. This kind of code collision problem as well as other interference problems caused by so much data being transmitted at one time must be resolved before the full potential of SAW identification tag technology can be realized.

Accordingly, what is needed in the art is a method to accommodate code collisions caused by simultaneous responses from multiple SAW identification tags.

SUMMARY OF THE INVENTION

To address the above-discussed deficiencies of the prior art, the present invention provides a method for accommodating code collisions from multiple SAW identification tag coded responses. In one embodiment, the method includes: (1) separating probable candidates by time-domain; (2) classifying the probable candidates by code-division separation; (3) employing known coded identification signals to adjust the probable candidates; and (4) correlating the multiple SAW identification tag coded response pulses to identify the probable candidates for further processing.

The present invention thus provides a method for identifying a coded response returned by a specific SAW identification tag when such response is included within a number of other coded signals being simultaneously returned. The present invention provides a useful and beneficial solution to a perceived problem of SAW identification tags always being in the "on" state. By being able to effectively discriminate and isolate a signal from among multiple signals, relatively inexpensive and robust SAW identification tags can be effectively used where other identification methodologies have proven to be deficient.

In one embodiment, the method includes focusing an interrogation pulse to within a defined space and, thus, reducing the number of coded response pulses returned. Because fewer signals are considered, potential code collisions are reduced with a corresponding reduction in identification response time.

A particularly beneficial aspect of the present invention is provided by an embodiment that provides for storing multiple SAW identification tag coded response pulses in a database for further processing. In still another embodiment, signals are correlated by filtering the multiple coded response pulses and matching signals for further processing.

In yet still another embodiment to be described herein, known signal templates are subtracted from probable candidates for identification and eliminated from further consideration. In one embodiment, known signal templates include only known candidates. Thus, if a class of SAW identification tags is assigned to auto-parts and another class is assigned to pharmaceuticals, all the coded response signals attributable to an auto-parts template are eliminated from consideration when response pulses are processed from a pallet of SAW tagged pharmaceuticals.

In still another embodiment of the invention, the time-domain separation is based on a hierarchical order. An aspect of this embodiment provides for the hierarchical order to be from a general object classification to a specific object included within the general object classification. Thus, if certain SAW identification tags with a time-domain separation are assigned to pallets, another to boxes carried on pallets, and still another to objects in the boxes, when boxes are to be identified the method provides for the elimination of all response pulses from pallet tags and object tags.

A particularly useful embodiment provides for error-checking the SAW tag coded response pulses. By performing an error-check on the most probable candidate, it can be determined if the process has reached a correct or incorrect result. Another aspect of the invention provides for separating, classifying, employing and correlating to be conducted in a pre-determined sequence, which sequence can be modified or changed depending on the task at hand.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
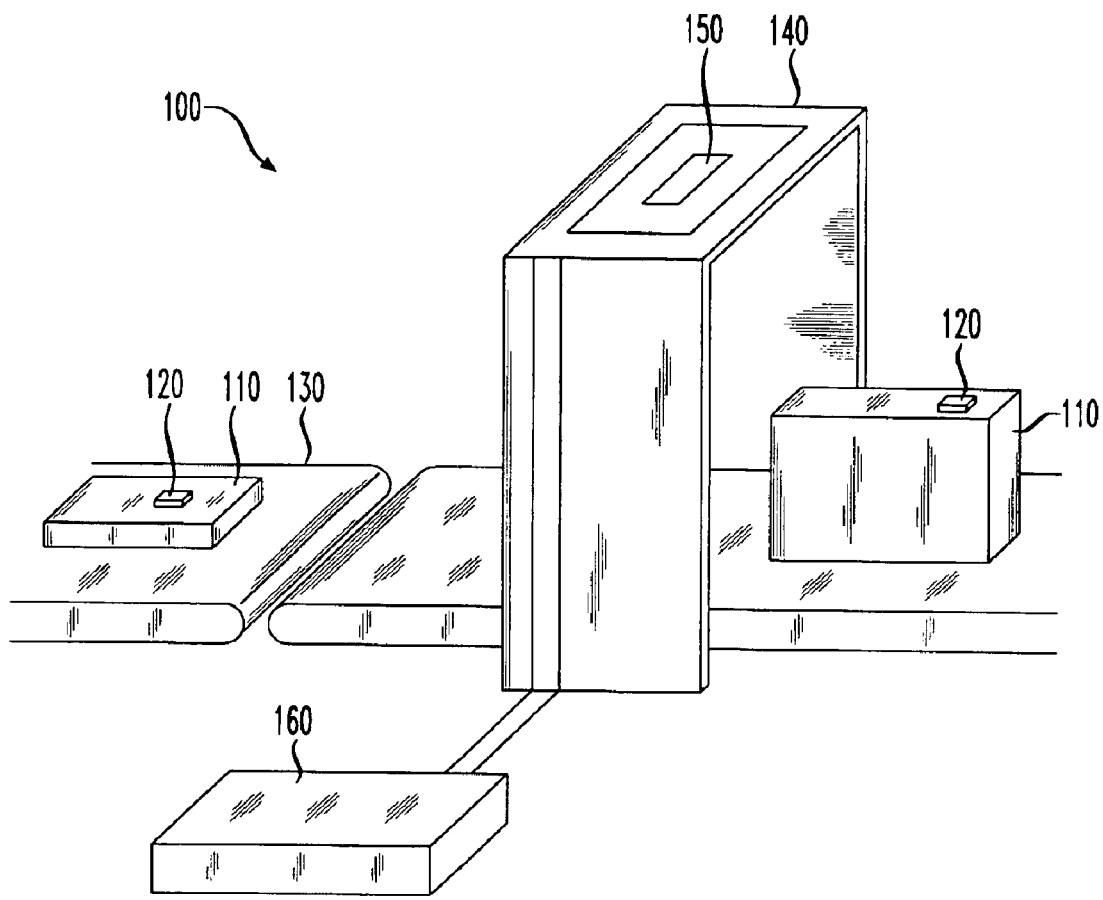
FIG. 1 illustrates a representative embodiment of a SAW identification tag system for identifying articles by interrogating a SAW identification tag located on each article and decoding the response signal.

Referring initially to FIG. 1, illustrated is a representative embodiment of a SAW identification tag system 100 for identifying articles 110 by interrogating a SAW identification tag 120 located on each article 110 and decoding the response signal. For illustration purposes, a conveyor belt 130 is being used to transport articles 120 from one location to another. This is, of course, but one of a large number of potential applications where a SAW identification tag system 100 can be usefully employed. The conveyor belt 130 has an associated SAW tag reader 140 for interrogating SAW tags 120 and identifying the articles 120 or other articles to which they are attached. An antenna 150, coupled to the SAW tag reader 140, is positioned to illuminate SAW tags 120 on the conveyor belt 130 by transmitting an interrogation pulse and detects reflected signals carrying coded responses. The coded responses are transmitted to the SAW tag reader 140 where the signal will be decoded. Associated with the SAW tag reader 140 is a database 160 where the response data is stored for possible further processing. When processed and correctly decoded, each response pulse will reveal a globally unique code related to a specific SAW identification tag 120 located on a specific article 110.

Ideally the system 100 will work as described above. However, when a large number of SAW identification tags 120 are simultaneously illuminated, each will be excited into returning its own globally unique response pulse. Such would be the case, for example, where a pallet containing a large number of articles 120 is illuminated with an interrogation pulse and a SAW tag 120 on each article 120 returns a globally unique coded response pulse. With the transmission of so many signals simultaneously, the SAW tag reader 140 may be overwhelmed and encounter difficulty in reliably processing and identifying the SAW tags 120 and their associated articles 110. The present invention addresses this situation and provides a unique multi-pronged solution for resolving such inherent code collision problems.

It should be noted that a detailed description of SAW identification tags 120 and SAW identification tag readers 140 is not set forth herein. With respect to SAW identification tags 120, reference is hereby made to U.S. patent application Ser. No. 10/024,624, entitled "Surface Acoustic Wave Identification Tag Having Enhanced Data Content and Methods of Operation and Manufacture Thereof," Hartmann, Clinton S. (Hartmann One), commonly assigned with the invention and incorporated herein by reference. A description of SAW identification tag readers 140 is described in detail in U.S. patent application Ser. No. 10/066,249, entitled "Reader For a High Information Capacity Saw Identification Tag and Method of Use Thereof," Hartmann, Clinton S., also commonly assigned with the invention and incorporated herein by reference.

Figure 2:
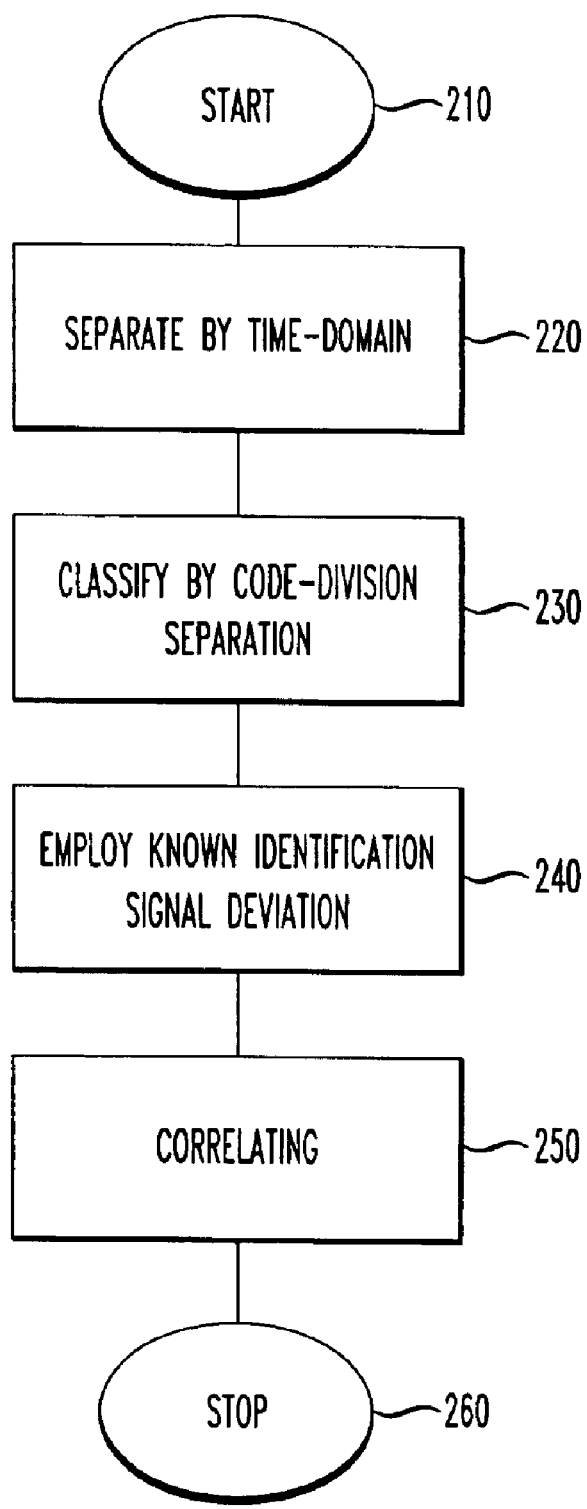
FIG. 2 illustrates a flow chart illustrating one embodiment of a method for accommodating code collisions from multiple SAW identification tag coded responses.

Turning now to FIG. 2, illustrated is a flow chart illustrating one embodiment of a method 200 for accommodating code collisions from multiple SAW identification tag coded responses. The illustrated method 200 is a layered approach involving a number of SAW tag anti-collision techniques, each of which contributes to the resolution of collision problems cumulatively.

After the SAW tags are illuminated and response pulses detected the method commences with a start step 210. In a time domain step 220, the time domain characteristics of the coded response pulses from the interrogated SAW tags are used to separate the probable candidates. Inherent in the construction of each SAW tag will be a time-domain response characteristic based on timing of the response pulse coding. This characteristic is a result of the physical separation between the signal input transducers on the tag and the reflectors encoding the response pulse, which features are discussed in detail in Hartmann One. Measurable propagation delay of a pulse along the surface of a SAW tag permits different time-domains to be assigned different groups of SAW tags, which can, in turn, be assigned to different groups or classes of objects. In one embodiment of the present invention, time-domains for articles are based on a hierarchical order. Thus, one time-domain may be attributed to pallets, another to cartons on pallets and still another to objects in the cartons. In another aspect of the invention, the hierarchical order will generally go from a general category or grouping of objects or articles to a specific object or article. For example, automobiles may be assigned one time domain, auto components (engines, transmissions, etc.) another, and auto parts (gears, pistons, spark plugs, etc.) still another. Further information and detail regarding the establishment of time-domains on SAW tags is set forth in U.S. patent application Ser. No. 10/103,684, entitled "Reader and Response Control System for Discrimination Between Multiple Surface Acoustic Wave Identification Tags and Method of Operation Thereof," Hartmann, Clinton S., commonly assigned with the invention and incorporated herein by reference. After determining the time-domain of each response pulse, responses having a time-domain that are not of interest can be eliminated from further consideration.

The time-domain characteristics of response pulses is beneficially employed to accommodate the data collisions caused by multiple SAW identification tag coded responses. If individual SAW tags involved in a potential collision are encoded with differing time delays and a larger number of pulse positions are used to encode a data group, SAW tags having a predetermined specific time interval between receipt of an interrogation pulse and return of a response pulse can be separated from the other response pulses and selected for processing.

Another aspect of avoiding collisions involves the process of encoding data on a SAW tag involves partitioning the entire field of potential reflection points on the SAW tag into groups of reflection points. Each group of reflection points will encode a number of bits of data by assigning a unique pulse pattern within a group to each unique input code. A technique to avoid collisions between multiple SAW tags is to provide the groups with a few more pulse positions than is absolutely necessary for encoding a given amount of data to provide more encoding flexibility. An aspect of the invention provides for using an encoding algorithm to minimize the chances of having SAW tag responses that appear to exactly coincide, is to encode 16 bits of data with four pulses and increase the number of reflection points within a group from 37 to 42 and have pulse assignments evenly distributed across the 42 pulse position encoding range. This aspect of the invention can be termed distributed pulse assignment.

In the illustrated embodiment, after the separate by time-domain step 220, the probable candidates for further processing are identified. The illustrated embodiment provides for the remaining candidates to be classified in a classify by code-division separation step 230. This encoding method assigns sequential serial number codes to SAW tag pulse response codes that return response pulses from widely different pulse positions on the SAW tag substrate. Thus, multiple SAW tags having a limited range of serial numbers, that are most likely to show up on a single pallet, for example, will have maximally separated pulse assignments and thereby facilitate the separation of the response pulses into individual SAW tag responses and minimize the probability of a collision. Sequential code separation is accomplished by using a defined code index that is separate from the defined code value (e.g. serial number)of the application. The sequential defined code indices are used to specify pulse patterns that have the largest mutual cross correlation values. Thus, two SAW tags with adjacent or nearly adjacent indices will have very similar pulse patterns which are difficult to separate. The SAW tag reader maps these sequential code values to code indices by multiplying the code value by an odd number (e.g. 49) and [reducing the multiplicand modulo 65536. The code index so derived will jump over clusters of codes with high mutual cross correlation.]

Code scrambling technique can also be used when encoding SAW tags to alleviate potential collision problems. In many potential collision environments the fields and subfields on a SAW tag substrate will have identical values. To avoid encoding identical fields with identical pulse patterns, the coding can utilize a method encoding where the least significant bit of the serial number for each tag is used as a scrambling code for the more statically assigned data. Thus, even though certain code data fields on two or more SAW tags may be identical, the SAW tags containing those codes can use separable pulse encoding patterns.

Because SAW tags are passive devices, advantage can be taken of certain known characteristically predictable responses when excited by certain interrogation signals. If the interrogation signal includes characteristics that predictably affect the response pulse returned by the SAW tag, the SAW tags can be constructed to classify certain SAW tags returning certain response pulses into groups. In nearly every instance certain identification codes will not be of interest. These codes can be eliminated from the codes being considered by the SAW tag reader for possible identification. That is, using predictable characteristics transferred by the interrogation signal, signal processing techniques can be used to classify probable candidates. Certain coded responses can be eliminated from further consideration and potential candidates for further processing can be identified by the code-division characteristics of the response pulse. More detail regarding code-division classification is set forth in U.S. patent application Ser. No. 10/268,108, entitled "A Transfer Function System for Determining an Identifier on a Surface Acoustic Wave Identification Tag and Method of Operating the Same," Hartmann, Clinton S. and Bellamy, John C., commonly assigned with the invention and incorporated herein by reference.

The remaining potential candidates, if any, can then be adjusted to eliminate certain candidates not of interest in an employ known identification signal deviation step 240. To bring order to the widespread usage of SAW identification tag codes and assure global uniqueness to each SAW tag assigned to an object, an object naming protocol must be used. This protocol will assign each class or category of objects a specific block or group of SAW identification tag codes. Each object within a class or category will then be tagged with a SAW tag that has been assigned a globally unique identification code out of the block or group of codes reserved for that class or category. An object naming protocol and its use in a network environment is described in detail in U.S. patent application Ser. No. 10/062,791, entitled "Object-naming Network Infrastructure For Identification Tags And Method of Operation Thereof," Hartmann, Clinton S. and Bonner, William C., commonly assigned with the invention and incorporated herein by reference.

A protocol that has a globally unique identification code assigned to each possible SAW identification tag can be done because of the high data capacity of SAW tags. This data capacity enables several different fields of information to be encoded on a tag, which fields may include, for example, information about the tag manufacturer, an industry identification field, an error correction field, an object identification number field, and so on. A customer field can be used, for example, to provide information on the business or businesses using the SAW tag or series of tags to identify objects. If a certain portfolio or block of SAW identification tag numbers are assigned to a specific industry or customer, additional hierarchical fields can be used to identify objects at different levels. For example, if a field indicates a SAW tag has been assigned to the automotive manufacturing industry, another field can be used to designate the specific manufacturer, another for the model of automobile, and so on. All this information is maintained in a database associated with the SAW tag reader.

Continuing to use the automobile business as an example, assume that one category or class of identification numbers is reserved for engine parts and another class or category for transmission parts. Referring back to FIG. 1, if an automotive industry user is identifying articles 110 on a pallet and it is known that the pallet is carrying transmission parts, the database 160 associated with the SAW tag reader 140 will eliminate from consideration all codes for engine parts as well as all other non-relevant classes and categories. All coded response pulses to an interrogation pulse not within the database of known potential candidates will be subtracted from the coded response pulse possibilities and the probable candidates will be adjusted accordingly.

The remaining probable candidates, if any, are then put through a correlating step 250 to identify probable candidates for further processing. Referring again to FIG. 1, as the article 120 on the conveyor belt 130 moves along, the SAW tag reader 140 will transmit a number of interrogation pulses, each of which generates a response pulse from each SAW tag 120 illuminated. These response pulses are stored in the database 160 associated with the SAW tag reader 140 for further processing. Of course this processing will be taking place while the article 120 is still being interrogated by the SAW tag reader 140 but, significantly, the present invention permits further processing after the article 110 has passed the interrogation area. This is possible because SAW tag 120 identification does not rely on a "tree" methodology to resolve potential collisions. This is but one of the major advantages of a using a system based on SAW identification tags 120.

In one embodiment of the invention the various combinations of response signals in the data base can be correlated using match-filtering techniques to identify those signals having the best potential of being the right response signal to be associated with a particular SAW tag 120. Once identified this signal can be subjected to further processing to actually decode the signal. After the signal is decoded and it has been determined that it was generated by a specific SAW tag 120, an error check signal encoded in one of the fields on the SAW tag 120 can be used to verify that this SAW tag is, in fact, the one transmitting the encoded response pulse read by the SAW tag reader. The method concludes with a stop step 260.

Figure 3:
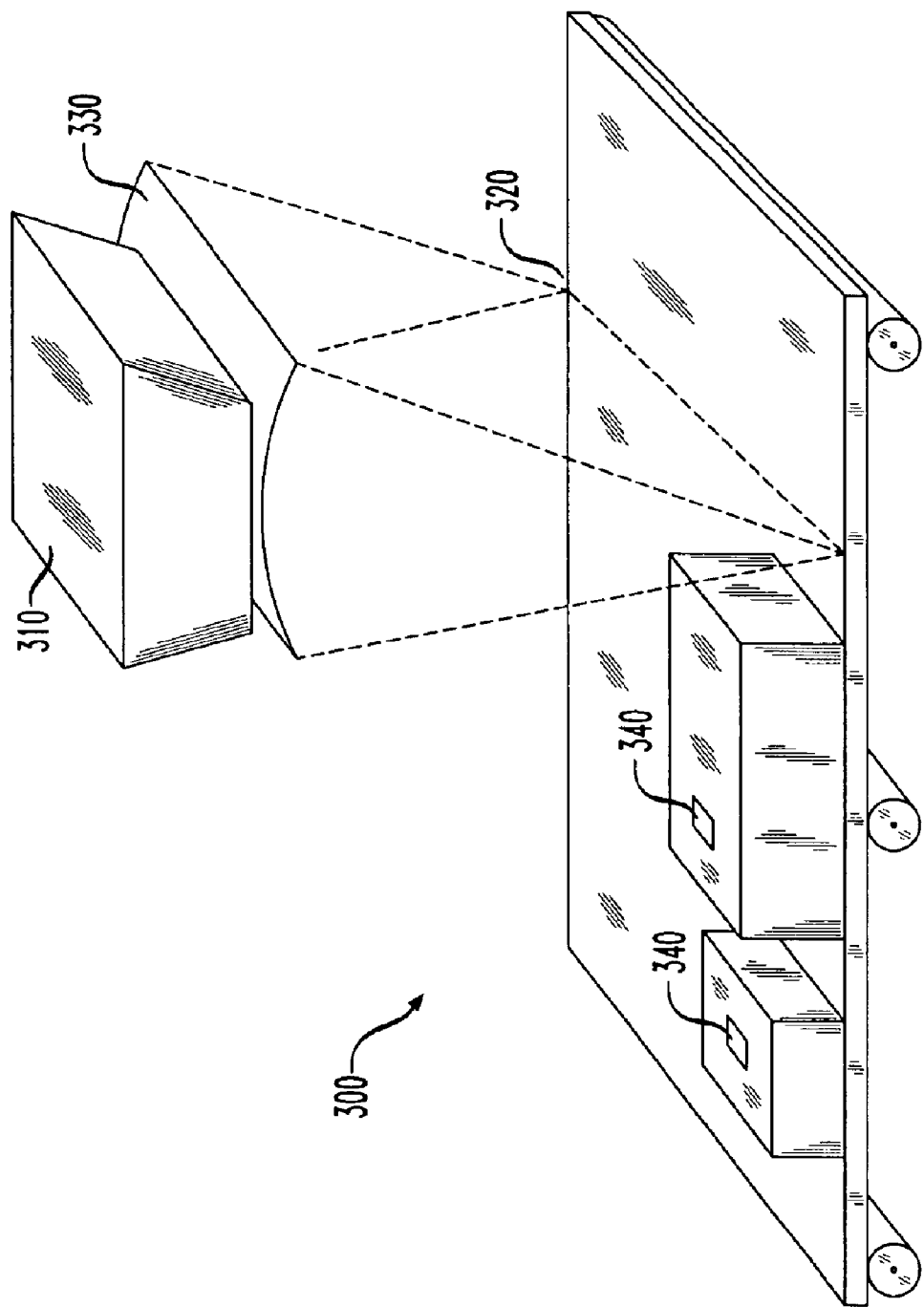
FIG. 3 illustrates an antenna system for use with a SAW tag reader that focuses an interrogation pulse to within a defined area.

Turning now to FIG. 3, illustrated is an antenna system 300 for use with a SAW tag reader 310 that focuses an interrogation pulse to within a defined area 320. This is but one of several embodiments that can be used to focus an interrogation pulse to within a defined area 320. The use of a directional antenna 330 limits the number of SAW tags 340 that simultaneously produce responses to a SAW tag reader 310. Use of a high frequency carrier such as 2.44 GHz will greatly facilitate the use of a highly directive antenna 330 that has a small physical size. Not only will a directive transmitting antenna 330 limit the number of SAW tags 340 that receive an interrogation pulse to within the defined area 320, but a directive receiving antenna 330 will further limit the number of SAW tag 340 response pulses simultaneously received by the SAW tag reader 310. If the transmitting and receiving antennas 330 are positioned perpendicular to each other to form the defined area 320, the maximum amount of SAW tag 340 isolation will be achieved with only those SAW tags 340 located at the intersection of the two antenna patterns being read. In summary, the significance of these embodiments withing the context of an anti-collision method is that if fewer response pulses are detected, the number of collision candidates is reduced and the amount of time to resolve collision issues will also be reduced. The illustrated embodiment is discussed in detail in U.S. patent application Ser. No. 10/103,650, and its continuation in part Ser. No. 10/326,540, entitled "Anti-Collision Interrogation Pulse Focusing System for Use with Multiple Surface Acoustic Wave Identification Tags and Method of Operation Thereof", Hartmann, Clinton S. and Claiborne, Lewis T., commonly assigned with the invention and incorporated herein by reference.

Figure 4:
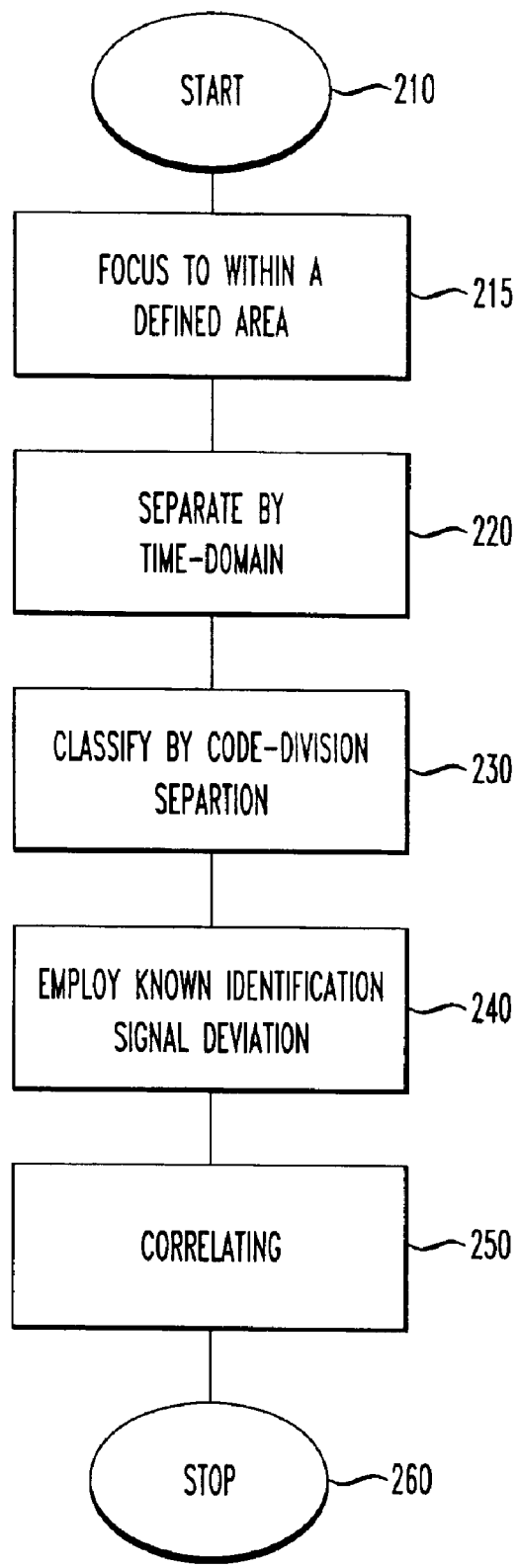
FIG. 4 illustrates the flow chart illustrated in FIG. 2 incorporating the embodiment of the invention for accommodating code collisions from multiple SAW identification tag coded responses by focusing an interrogation pulse to within a defined area step.

Turning now to FIG. 4, illustrated is the flow chart illustrated in FIG. 2 incorporating the embodiment of the invention for accommodating code collisions from multiple SAW identification tag coded responses by focusing an interrogation pulse to within a defined area step 215. By using the present invention to focus an interrogation pulse within a definite space so only SAW tags within that space are interrogated, the problem of code collision is more easily controlled, thus simplifying the remaining steps.

The present invention also provides several methods for identifying a unique SAW identification tag coded response pulse for further processing from among multiple SAW identification tag coded response pulses. Such methods will be clear to those of ordinary skill in the pertinent art from the detailed description above.

Although the present invention has been described in detail, those skilled in the art should understand that they can make various changes, substitutions and alterations herein without departing from the spirit and scope of the invention in its broadest form.

What is claimed is:

1. A method of accommodating code collisions from multiple SAW identification tag coded response pulses, comprising:
    separating probable candidates by time-domain;
    classifying said probable candidates by code-division separation;
    employing known coded identification signals to adjust said probable candidates; and
    correlating said multiple SAW identification tag coded response pulses to identify said probable candidates for further processing.

2. The method as described in claim 1 further comprising focusing an interrogation pulse to within a defined space.

3. The method as described in claim 1 wherein said correlating is further comprised of storing said multiple SAW identification tag coded response pulses in a database for further processing.

4. The method as described in claim 1 wherein said correlating is further comprised of filtering said multiple SAW identification tag coded response pulses for matching signals.

5. The method as described in claim 1 further comprising subtracting certain known coded identification signals from said probable candidates.

6. The method as described in claim 1 wherein said known coded identification signals include known signal templates.

7. The method as described in claim 1 wherein said time-domain is based on a hierarchical order.

8. The method as described in claim 7 wherein said hierarchical order is from a general object classification to a specific object included within said general object classification.

9. The method as described in claim 1 further comprising error-checking said SAW identification tag coded response pulses.

10. The method as described in claim 1 wherein said separating, classifying, employing, and correlating are in a pre-determined sequence.

11. A method of identifying a unique SAW identification tag coded response pulse for further processing from among multiple SAW identification tag coded response pulses, comprising:
    separate said multiple SAW identification tag coded response pulses by time-domain to identify probable candidates;
    classify said probable candidates by code-division;
    employ known coded identification signals to adjust said probable candidates; and
    correlate said multiple SAW identification tag coded response pulses to identify said probable candidates for further processing.

12. The method as described in claim 11 further comprising focusing an interrogation pulse to within a defined space.

13. The method as described in claim 11 wherein said correlate is further comprised of storing said multiple SAW identification tag coded response pulses in a database for further processing.

14. The method as described in claim 11 wherein said correlate is further comprised of filtering said multiple SAW identification tag coded response pulses for matching signals.

15. The method as described in claim 11 further comprising subtracting said known coded identification signals from said probable candidates.

16. The method as described in claim 11 wherein said known coded identification signals include a known signal templates.

17. The method as described in claim 11 wherein said time-domain is based on a hierarchical order.

18. The method as described in claim 17 wherein said hierarchical order is from a general object classification to a specific object within said general object classification.

19. The method as described in claim 11 further comprising error-checking said SAW identification tag coded response pulses.

20. The method as described in claim 11 wherein said separate, classify, employ and correlate are in a pre-determined sequence.

* * * * *